(12) United States Patent
Salmimaa et al.

(10) Patent No.: US 12,182,326 B2
(45) Date of Patent: Dec. 31, 2024

(54) APPARATUS, METHODS AND COMPUTER PROGRAMS FOR CONTROLLING IMAGE AUGMENTATIONS

(71) Applicant: Nokia Technologies Oy, Espoo (FI)

(72) Inventors: Marja Pauliina Salmimaa, Tampere (FI); Toni Johan Jarvenpaa, Akaa (FI); Arto Juhani Lehtiniemi, Lempaala (FI)

(73) Assignee: Nokia Technologies Oy

( * ) Notice: Subject to any disclaimer, the term of this patent is extended or adjusted under 35 U.S.C. 154(b) by 0 days.

(21) Appl. No.: 18/495,913

(22) Filed: Oct. 27, 2023

(65) Prior Publication Data

US 2024/0143075 A1 May 2, 2024

(51) Int. Cl.
*G06F 3/01* (2006.01)
*G02B 27/00* (2006.01)
*G02B 27/01* (2006.01)

(52) U.S. Cl.
CPC ......... *G06F 3/013* (2013.01); *G02B 27/0093* (2013.01); *G02B 27/0101* (2013.01); *G02B 27/017* (2013.01); *G02B 27/0179* (2013.01); *G02B 2027/0138* (2013.01); *G02B 2027/014* (2013.01); *G02B 2027/0178* (2013.01); *G02B 2027/0185* (2013.01)

(58) Field of Classification Search
CPC ..... G06F 3/013; G06F 3/011; G02B 27/0179; G02B 2027/0178; G02B 27/017; G02B 27/01; G02B 27/0093; G06V 20/20
See application file for complete search history.

(56) References Cited

U.S. PATENT DOCUMENTS

| | | |
|---|---|---|
| 2014/0085198 A1 | 3/2014 | Jahnke et al. ............... 345/157 |
| 2015/0212330 A1 | 7/2015 | Li et al. |
| 2016/0209917 A1 | 7/2016 | Cerriteno et al. |
| 2018/0314324 A1 | 11/2018 | Abed Aljawad et al. |
| 2019/0187482 A1 | 6/2019 | Lanman |

*Primary Examiner* — Sanjiv D. Patel
(74) *Attorney, Agent, or Firm* — McCarter & English LLC

(57) ABSTRACT

Examples of the disclosure enable image augmentations to be used with images of users wearing head mounted items. In examples of the disclosure an apparatus can be configured to use gaze tracking to determine a location of a user's pupil wherein the user is wearing a head mounted item. The apparatus can also be configured to enable display of an indication of the location of the user's pupil so that the indication is visible on a surface of the head mounted item. The indication is configured to be used for positioning at least one image augmentation for a captured image comprising the user.

15 Claims, 10 Drawing Sheets

APPARATUS, METHODS AND COMPUTER PROGRAMS FOR CONTROLLING IMAGE AUGMENTATIONS

TECHNOLOGICAL FIELD

Examples of the disclosure relate to apparatus, methods and computer programs for controlling image augmentations. Some relate to apparatus, methods and computer programs for controlling image augmentations for images of a user wearing a head mounted item.

BACKGROUND

Image augmentations comprise filters or graphical items that can be added to captured images. For example, the filters or graphical items can be positioned overlaying a captured image or part of a captured image. Such image augmentations could be used in mediated reality applications, in messaging applications, or in any other suitable applications.

BRIEF SUMMARY

According to various, but not necessarily all, examples of the disclosure there may be provided an apparatus comprising means for:
 using gaze tracking to determine a location of a user's pupil wherein the user is wearing a head mounted item; and
 enabling display of an indication of the location of the user's pupil so that the indication is visible on a surface of the head mounted item and wherein the indication is configured to be used for positioning at least one image augmentation for a captured image comprising the user.

The at least one image augmentation may comprise a graphical overlay configured to be superimposed over at least part of the image comprising the user.

At least part of the indication may be configured to be incorporated as part of the at least one image augmentation.

The indication of the location of the user's pupil may be displayed on a shutter of the head mounted item.

The indication of the location of the user's pupil may comprise outcoupled light from the head mounted item.

At least part of an image displayed by the head mounted item may be adapted to enable the outcoupled light to be used to identify the position of the user's pupil.

The indication may comprise an indication of content currently being rendered by the head mounted item.

The means may be for enabling exchange of information with an electronic device being used to capture the image comprising the user wherein the information comprises information relating to at least one of: relative positions of the electronic device and the head mounted item, or relative orientations of the electronic device and the head mounted item.

The head mounted item may comprise an augmented reality headset.

According to various, but not necessarily all, examples of the disclosure there may be provided a head mounted item comprising an apparatus as described herein.

According to various, but not necessarily all, examples of the disclosure there may be provided a method comprising:
 using gaze tracking to determine a location of a user's pupil wherein the user is wearing a head mounted item; and
 enabling display of an indication of the location of the user's pupil so that the indication is visible on a surface of the head mounted item and wherein the indication is configured to be used for positioning at least one image augmentation for a captured image comprising the user.

According to various, but not necessarily all, examples of the disclosure there may be provided a computer program comprising instructions which, when executed by an apparatus, cause the apparatus to perform at least:
 using gaze tracking to determine a location of a user's pupil wherein the user is wearing a head mounted item; and
 enabling display of an indication of the location of the user's pupil so that the indication is visible on a surface of the head mounted item and wherein the indication is configured to be used for positioning at least one image augmentation for a captured image comprising the user.

According to various, but not necessarily all, examples of the disclosure there may be provided an apparatus comprising means for:
 detecting an indication of the location of a user's pupil wherein the user is wearing a head mounted item and the indication is displayed so that it is visible on a surface of the head mounted item;
 capturing one or more images comprising the user; and
 using the indication of the location of the user's pupil to position at least one image augmentation for at least one captured image comprising the user.

The image augmentation may comprise a graphical overlay configured to be superimposed over at least part of the image comprising the user.

The means may be for incorporating at least part of the indication as part of the at least one image augmentation.

The indication of the location of the user's pupil may be displayed on a shutter of the head mounted item.

The indication may comprises outcoupled light from the head mounted item.

The means may be for image processing the one or more images of the user to remove the indication of the location of the user's pupil from respective ones of the captured one or more images comprising the user.

The means may be for enabling exchange of information with the head mounted item wherein the information comprises information relating to at least one of: relative positions of an imaging device and the head mounted item, relative orientations of the imaging device and the head mounted item.

According to various, but not necessarily all, examples of the disclosure there may be provided an electronic device comprising an apparatus as described herein.

According to various, but not necessarily all, examples of the disclosure there may be provided a method comprising:
 detecting an indication of the location of a user's pupil wherein the user is wearing a head mounted item and the indication is displayed so that it is visible on a surface of the head mounted item;
 capturing one or more images comprising the user; and
 using the indication of the location of the user's pupil to position at least one image augmentation for at least one captured image comprising the user.

According to various, but not necessarily all, examples of the disclosure there may be provided a computer program comprising instructions which, when executed by an apparatus, cause the apparatus to perform at least:
 detecting an indication of the location of a user's pupil wherein the user is wearing a head mounted item and the indication is displayed so that it is visible on a surface of the head mounted item;

capturing one or more images comprising the user; and using the indication of the location of the user's pupil to position at least one image augmentation for at least one captured image comprising the user.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which.

Figure 1:
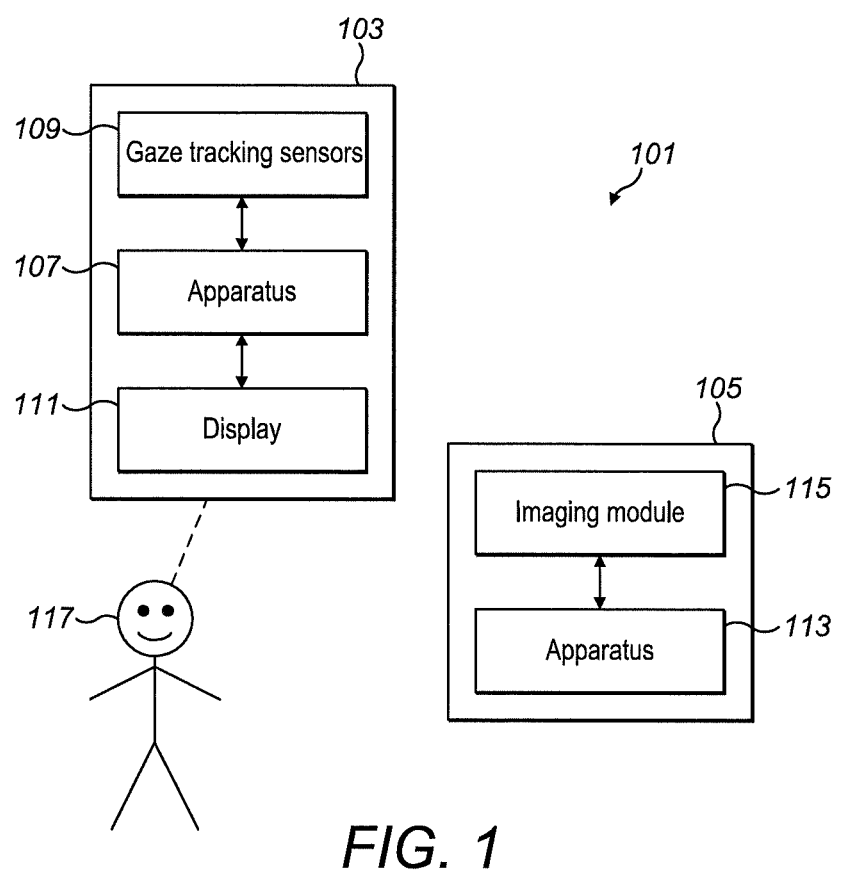
FIG. 1 shows an example system.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Corresponding reference numerals are used in the figures to designate corresponding features. For clarity, all reference numerals are not necessarily displayed in all figures.

DETAILED DESCRIPTION

Image augmentations can be used in mediated reality applications or messaging applications or any other suitable applications. Some of these image augmentations can be designed to overlay images of people. However, if a person in an image is wearing a headset or other similar device this will obstruct the person's eyes in the image and make it difficult to position the image augmentations correctly.

Examples of the disclosure enable image augmentations to be used with images of users wearing head mounted items. In examples of the disclosure the position of the user's pupil can be tracked and used to enable the image augmentations to be positioned.

FIG. 1 shows an example system 101 that could be used to implement examples of the disclosure. The system 101 comprises a head mounted item 103 and an electronic device 105. The system 101 could comprise additional or alternative components in other examples. A user 117 of the head mounted item 103 is also shown in FIG. 1. The user 117 and the head mounted item 103 and the electronic device 105 are not shown to scale.

The head mounted item 103 can comprise an item that a user 117 wears on their head. The head mounted item 103 could comprise a mediated reality device. The mediated reality device could be configured to provide augmented reality and/or virtual reality content for the user 117. The head mounted item 103 could comprise a head set or smart glasses or any other suitable type of item.

The head mounted item 103 can be worn on the user's head so that the user's head bears the weight, or at least partially bears the weight, of the head mounted item 103. When a user 117 is wearing the head mounted item 103, the head mounted item 103 covers, or partially covers, the user's eyes. This means that if the user 117 is wearing the head mounted item 103 then the user's eyes and the pupils of the user's eyes are occluded by the head mounted item 103, and are not visible.

In the example of FIG. 1 the head mounted item 103 comprises an apparatus 107, one or more gaze tracking sensors 109 and one or more displays 111. Only components that are referred to in the following description are shown in FIG. 1. Additional components could be provided in some examples of the disclosure. For instance, the head mounted item 103 could comprise one or more transceivers that enable the head mounted item 103 to communicate with the electronic device 105 or with any other suitable device.

Figure 9:
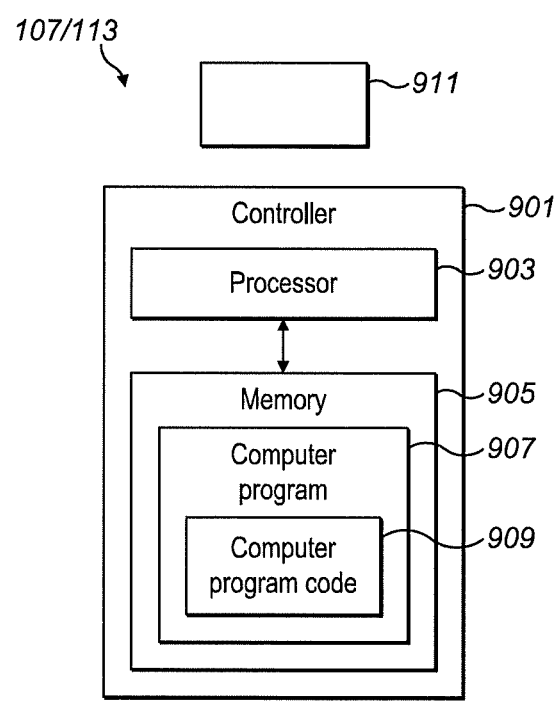
FIG. 9 shows an example apparatus.

The apparatus 107 can comprise a controller comprising a processor and memory. Examples of an apparatus 107 are shown in FIG. 9. The apparatus 107 can be configured to enable control of the head mounted item 103. For example, the apparatus 107 can be configured to control images that are displayed on the display 111 and/or process information obtained by the gaze tracking sensors 109 and/or to control any other suitable functions.

The gaze tracking sensors 109 can comprise any means that can be configured to track the position of the user's pupils. The gaze tracking sensors 109 can comprise imaging sensors or any other suitable type of sensors 109.

The gaze tracking sensors 109 are coupled to the apparatus 107 to enable information about the location of the user's pupils to be provided to the apparatus 107. This can enable the apparatus 107 to use the information about the location of the user's pupils to implement examples of the disclosure.

The display 111 can comprise an optics engine module that can be configured to display images or other content to the user 117 of the head mounted item 103.

In some examples other parts of the head mounted item 103 could function as a display 111. For instance, the head mounted item could comprise a liquid crystal shutter. The liquid crystal shutter could be controlled to display information or images as appropriate. Other types of display 111 could be used in some examples.

The display 111 can be configured so that at least some of the information displayed on the display 111 is visible to an external user looking at the user 117 wearing the head mounted item 103. For instance, in some examples light or images from the head mounted item 103 can leak outwards from the head mounted item 103 so that they are visible to an external user. An external user is someone who is looking at the user 117 wearing the head mounted item 103. In some examples information could be displayed on a liquid crystal shutter so that it can be viewed by an external user. Other arrangements for the display 111 could be used in other examples.

In the example of FIG. 1 the electronic device 105 comprises an apparatus 113, and an imaging module 115. Only components that are referred to in the following description are shown in FIG. 1. Additional components could be provided in some examples of the disclosure. For instance, the electronic device 105 could comprise one or more transceivers that enables the electronic device 105 to communicate with the head mounted item 103 or with any other suitable device.

The apparatus 113 can comprise a controller comprising a processor and memory. Examples of an apparatus 113 are shown in FIG. 9. The apparatus 113 can be configured to enable control of the electronic device 105. For example, the apparatus 113 can be configured to control the capturing of images by the imaging module 115, to control communications functions of the electronics device 105, and/or to control any other suitable functions.

The imaging module 115 can comprise any means that can be configured to capture images. The imaging module 115 can comprise a camera or any other suitable type of imaging means. The imaging module 115 can be configured to capture still image, video images or any other suitable types of images.

The imaging module 115 can comprise one or more sensors where the sensors can be configured to detect images. The sensors of the imaging module 115 can comprise any suitable type of image sensor. For instance, the sensor of the imaging module 115 can comprise a digital image sensor such as a charge-coupled-device (CCD) or a complementary metal-oxide-semiconductor (CMOS).

In examples of the disclosure images captured by the imaging module 115 can be processed by the apparatus 113 or by any other suitable processing means. The processing can comprise image augmentations such as applying filters or other graphical overlays to the captured images.

In examples of the disclosure the electronic device 105 can be positioned relative to the user 117 to enable the imaging device 115 to be used to capture images of the user 117. When the user 117 is wearing the head mounted item 103 this can make the positioning of the image augmentations more difficult because relevant facial features such as the pupils of the user 117 are potentially blocked by the head-mounted item 103 and so cannot be used as reference points to position the image augmentations.

Figure 2:
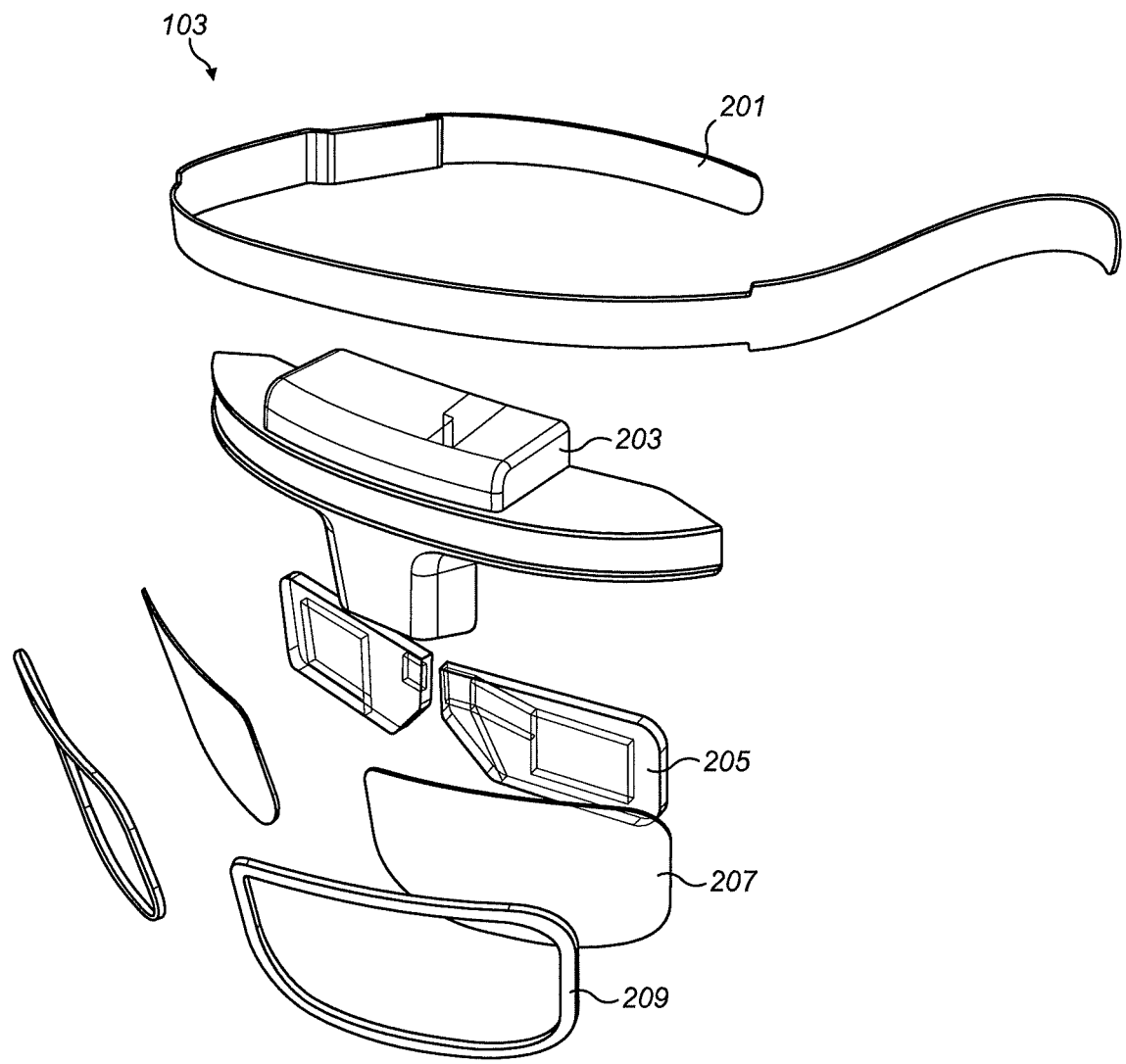
FIG. 2 shows an example head mounted item.

FIG. 2 shows an exploded view of example head mounted item 103. The head mounted item 103 in this example comprises a mediated reality headset. Other types of head mounted item 103 could be used in other examples. The head mounted item 103 can be configured to display mediated reality images to a user 117 wearing the head mounted item 103. The mediated reality images can be virtual reality images, augmented reality images, and/or any other suitable type of images or combination of images.

The head mounted item 103 shown in FIG. 2 comprises a mounting portion 201, an image source 203, one or more light guides 205, a liquid crystal shutter 207 and a frame 209. The head mounted item 103 can comprise other components that are not shown in FIG. 2 for example the head mounted item 103 could comprise an apparatus 107 such as the apparatus 107 shown in FIG. 1 or any other suitable means for controlling the head mounted item 103.

The mounting portion 201 can comprise means that enables the head mounted item 103 to be worn on the user's head or face. When the head mounted item 103 is mounted on the head or face of the user 117, the user's head or face supports the weight or at least a portion of the weight of the head mounted item 103. In the example of FIG. 2 the mounting portion 201 comprises temples or arms that are sized and shaped to fit around a user's head and behind their ears. This can enable the head mounted item 103 to be worn as a pair of glasses. Other means for mounting the head mounted item 103 on a user's head could be used in some examples.

The image source 203 comprises any means which can be configured to generate an image. In the example of FIG. 2 the image source 203 can comprise a display 111 and one or more optical components. The display 111 and the one or more optical components can be provided within the image source 203 and are not shown directly in FIG. 2.

The display 111 can comprise any means for providing an image. The display 111 can comprise a transmissive liquid crystal display (LCD) which can be illuminated by a backlight such as a light emitting diode (LED), a reflective liquid crystal on silicon (LCoS) display which can be illuminated using any suitable means, an emissive organic light emitting diode (OLED) display, a scanning LED display or any other suitable means. The display 111 can be configured to display images and/or any other suitable content. The display 111 can be configured to display content relating to virtual reality or augmented reality applications.

The optical components within the image source 203 can comprise any means which can be configured to focus a beam of light originating from or through the display 111. The optical components can be configured to focus or collimate the beam of light before the beam of light is provided to the light guide 205. In some examples of the disclosure the optical components could comprise one or more lenses.

The light guides 205 can be configured to direct light from the image source 203 to a position in which it will be incident on a pupil of the user 117. The light guides 205 can comprise an incoupling diffractive element and an outcoupling diffractive element. The incoupling diffractive element is positioned adjacent to the optical components of the image source 203 so that the beam of light from the image source 203 is incoupled into the light guide 205. The outcoupling diffractive element is positioned so that, when a user 117 is wearing the head mounted item 103 beams of light that are outcoupled by the outcoupling diffractive element are provided to the user's eyes. This can enable the user 117 to view the images provided by the image source 203.

In the example of FIG. 2 the head mounted item 103 comprises two light guides 205. The head mounted item 103 is configured so that when a user 117 is wearing the head mounted item 103 a first light guide 205 is positioned close to the user's left eye and a second light guide 205 is positioned close to the user's right eye.

Not all of the light that is incoupled to the light guide 205 is outcoupled by the outcoupling diffractive element towards the user's eyes. Some of the light leaks out of the light guide 205. Some of the light will leak out of the light guide 205 on the opposite side of the light guide 205 from the outcoupling diffractive element. Content from the image source 203 could be visible in the leaked light.

In the example of FIG. 2 the head mounted item 103 also comprises a liquid crystal shutter 207. The liquid crystal shutter 207 can provide means for adjusting the transparency of the head mounted item 103. Other means for adjusting the transparency could be used in other examples. The liquid crystal shutter 207 can control the amount of ambient light that passes through the head mounted item 103 and would be seen by the user 117 of the head mounted item 103. The transparency of the liquid crystal shutter 207 can be controlled by controlling the arrangement of the crystals within the liquid crystal shutter 207. The liquid crystal shutter 207 can also control the amount of the leaked light from the image source 203 that would be visible to an external user.

The liquid crystal shutter 207 can comprise a single liquid crystal or multiple liquid crystals. In examples where the liquid crystal shutter 207 comprise multiple liquid crystals the multiple liquid crystals can be arranged in a matrix. Where the liquid crystals are arranged in a matrix they could be controlled to display information that is visible to an external user.

In the example of FIG. 2 the head mounted item 103 comprises two liquid crystal shutters 207. The head mounted item 103 is configured so that when a user 117 is wearing the head mounted item 103 a first liquid crystal shutter 207 overlays a first light guide 205 that is positioned close to the user's left eye and a second liquid crystal shutter 207 overlays a second light guide 205 that is positioned close to the user's right eye. Other arrangements of the liquid crystal shutter 207 could be used in other examples.

In the example of FIG. 2 the head mounted item 103 also comprises a frame 209. The frame 209 is provided around an edge of the liquid crystal shutter 207 and the light guides 205. The frame can be configured to couple the liquid crystal shutter 207 and the light guides 205 together.

In examples of the disclosure the head mounted item 103 could comprise components that are not shown in FIG. 2. For example, the head mounted item 103 could also comprise one or more gaze tracking sensors. These could be positioned within the head mounted item 103 so that the positions of the user's pupils can be monitored.

The example head mounted item 103 of FIG. 2 could be used to implement examples of the disclosure.

Figure 3A:
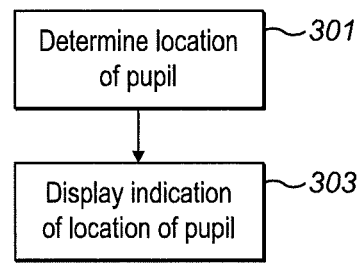
FIGS. 3A and 3B show example methods.

FIG. 3A shows an example method. The method could be implemented by an apparatus 107 in a head mounted item 103 or by any other suitable means. The head mounted item 103 can be an augmented reality headset or could be configured for any other suitable purposes.

The method comprises, at block 301, using gaze tracking to determine a location of a user's pupil. The user 117 is a user 117 who is wearing a head mounted item 103. For example, the user 117 could be consuming mediated reality content via the head mounted item 103.

The gaze tracking could be performed using one or more gaze tracking sensors 109 or any other suitable means. In some examples the location of both of the user's pupils could be determined. In some examples the location of only one of the user's pupils might be determined. For instance, if the head mounted item 103 is a monocular device or if the image augmentation only needs to be positioned around one eye then the gaze tracking sensors 109 might only be used to monitor the location of one pupil.

At block 303 the method comprises enabling display of an indication of the location of the user's pupil. The indication of the location of the user's pupil is displayed so that the indication is visible on an outer surface of the head mounted item 103. The indication can be displayed so that it is visible to an external user who is looking at the user 117 using the head mounted item or at the electronic device 105. The indication can be displayed so that it is visible in images of the user 117 wearing the head mounted item 103. The indication can be displayed so that it can be detected in captured images of the user 117 wearing the head mounted item 103.

Any suitable means can be used to display the indication of the location of the user's pupil. In some examples the indication could be displayed on a shutter 207. The shutter 207 could be a liquid crystal shutter 207 as shown in FIG. 2 or any other suitable type of shutter. The shutter 207 could for example absorb transmitted light only on the displayed pupil position.

In some examples outcoupled light from the head mounted item 103 can be used to display the indication of the location of the user's pupil. The outcoupled light could be leaked light or any other suitable light. In such examples at least part of an image displayed by the head mounted item 103 can be adapted to enable the outcoupled light to be used to identify the position of the user's pupil. For instance, the image, or part of the image could be moved so that it is aligned with the user's pupil or a part of the image that is already aligned with the user's pupil could be adapted to provide an appropriate indication. The displayed light could consist of visible or infrared wavelengths, or of a combination of both. In some examples, where the indication comprises infrared light wavelengths, the infrared light might be visible to the electronic device 105 but not to the user 117. The wavelengths of the infrared light could be between 1 mm and 700 nm and the wavelengths of the visible light could be between 700 and 400 nm. Other ranges of light could be used.

Any suitable means can be used to determine the location at which the indication should be displayed. In some examples the location at which the indication should be displayed is determined based on gaze tracking information or any other suitable information. In some examples the location can be determined using information relating to the position of the electronic device 105 that is being used to image the user. The information about the location of the electronic device 105 could be obtained form one or more sensors of the head mounted item 103. For instance, one or more LiDAR sensors could be used to detect the locations of objects in the vicinity of the head mounted item 103. In some cases the information could be obtained from the electronic device 105 via a communication link. The information about the position of the electronic device 105 can ensure that the indication is placed on an axis between the user's pupil and the electronic device 105.

The indication of the location of the user's pupil is configured to be used for positioning at least one image augmentation for a captured image comprising the user 117. The indication can have a particular size or shape or other features that enable it to be used as a point of reference for positioning on or more image augmentations. The indication can be detected by performing image or pattern recognition on captured images of the user 117.

The indication of the location of the user's pupil can comprise any suitable graphical items or information. In some examples the indication can comprise an indication of content currently being rendered by the head mounted item 103. This could comprise an icon indicating the content or a part of the content, or any other suitable indication that represents the content.

The image augmentation can comprise a graphical overlay that is configured to be superimposed over at least part of the image comprising the user 117. For example, the image augmentation could be a filter or other graphical item that is intended to be positioned over a specific part of an image of the user 117. The images of the user 117 to which the image augmentations are to be applied can be images that are captured by an electronic device 105. The electronic device 105 can be a separate device to the head mounted item 103. The electronic device 105 that captures the images of the user 117 could be as shown in FIG. 1 or could be any other suitable type of device.

In some examples the indication of the position of the user's pupils, or at least part of the indication, can be configured to be incorporated as part of the at least one image augmentation. For example, the indication could comprise graphics that can be combined with part of a graphical overlay.

To enable the incorporation of the indication within the image augmentation there can be some exchange of information between the head mounted item 103 and the electronic device 105. For instance, in some examples the image augmentation that is to be used could be selected based on an input at the electronic device 105. In this case a signal can be transmitted from the electronic device 105 to the head mounted item 103 indicating the image augmentation that is to be applied. In response to this signal the head mounted item 103 can control the display 111 and/or the shutter 207 to display an indication that can be incorporated within the selected image augmentation. In some examples the image augmentation that is to be used could be selected based on the indications that are displayed by the head mounted item 103. For instance, the electronic device 105 can detect the indications that are displayed by the head mounted item 103. The electronic device 105 can then select an image augmentation based on the indications that have been detected.

In some implementations of the disclosure the head mounted item could be controlled to perform additional blocks that are not shown in FIG. 3A. For example, the head mounted item 103 could be configured for wireless communication with the electronic device 105 that is used to capture the images of the user 117. In such cases the method could also comprise enabling the exchange of information with the electronic device 105. The information that is exchanged could comprise information that facilitates the positioning of the image augmentations. For example, the information could comprise information relating to relative positions of the electronic device 105 and the head mounted item 103, relative orientations of the electronic device 105 and the head mounted item 103, or any other suitable information.

Any suitable trigger event can cause the display of the indications according to the method of FIG. 3A to be implemented. In some examples the indication could be displayed in response to a determination that an electric device 105 is being used to capture images of the user 117. The apparatus 107 could determine that an image is being captured by receiving a message or signal from the electronic device 105, by detecting the electronic device 105, by detecting a user input, or by any other suitable means.

Figure 3B:
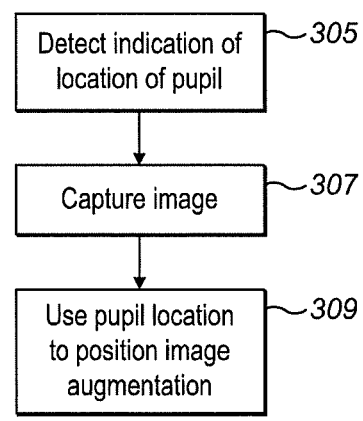

FIG. 3B shows another example method. The method could be implemented by an apparatus 113 in an electronic device 105 or by any other suitable means. The electronic device 105 can be used to capture images of a user 117 wearing a head mounted item 103. The electronic device 105 could be as shown in FIG. 1 or could be any other suitable type of device.

The method comprises, at block 305, detecting an indication of the location of a user's pupil. The user 117 is the user of the head mounted item 103.

The indication that is detected is an indication that is displayed by the head mounted item 103. The indication is displayed so that it is visible on surface of the head mounted item 103. The surface could be an outer surface or any other suitable surface of the head mounted item 103.

At block 307 the method comprises capturing one or more images comprising the user 117. The imaging module 115, or any other suitable means, can be used to capture the images comprising the user 117. The captured images might comprise at least part of the user's face. The user's eyes might not be visible in the captured images because they are blocked by the head mounted item 103.

At block 309 the method comprises using the indication of the location of the user's pupil to position at least one image augmentation for at least one captured image comprising the user 117. In examples of the disclosure the indication of the location of the user's pupil can be used as reference points to control the positioning of the image augmentations. The indication of the location of the user's pupil can be used instead of the location of the actual pupils.

In some examples the method can comprise blocks that are not shown in FIG. 3B. For example, there might be additional processing performed on the captured images. The additional processing could be performed by the apparatus 113 of the electronic device 105 or by any other suitable means. The additional processing could comprise image processing. The image processing could be used to remove the indications of the location of the user's pupil from the captured images of the user 117 or could be used for any other suitable purpose.

In some examples the electronic device 105 could be configured for wireless communication with the head mounted item 103 that is used to capture the images of the user 117. In such cases the method could also comprise enabling the exchange of information with the head mounted item. The information that is exchanged could comprise information that facilitates the positioning of the image augmentations. For example, the information could comprise information relating to relative positions of the electronic device 105 and the head mounted item 103, relative orientations of the electronic device 105 and the head mounted item 103, or any other suitable information.

Figure 4:
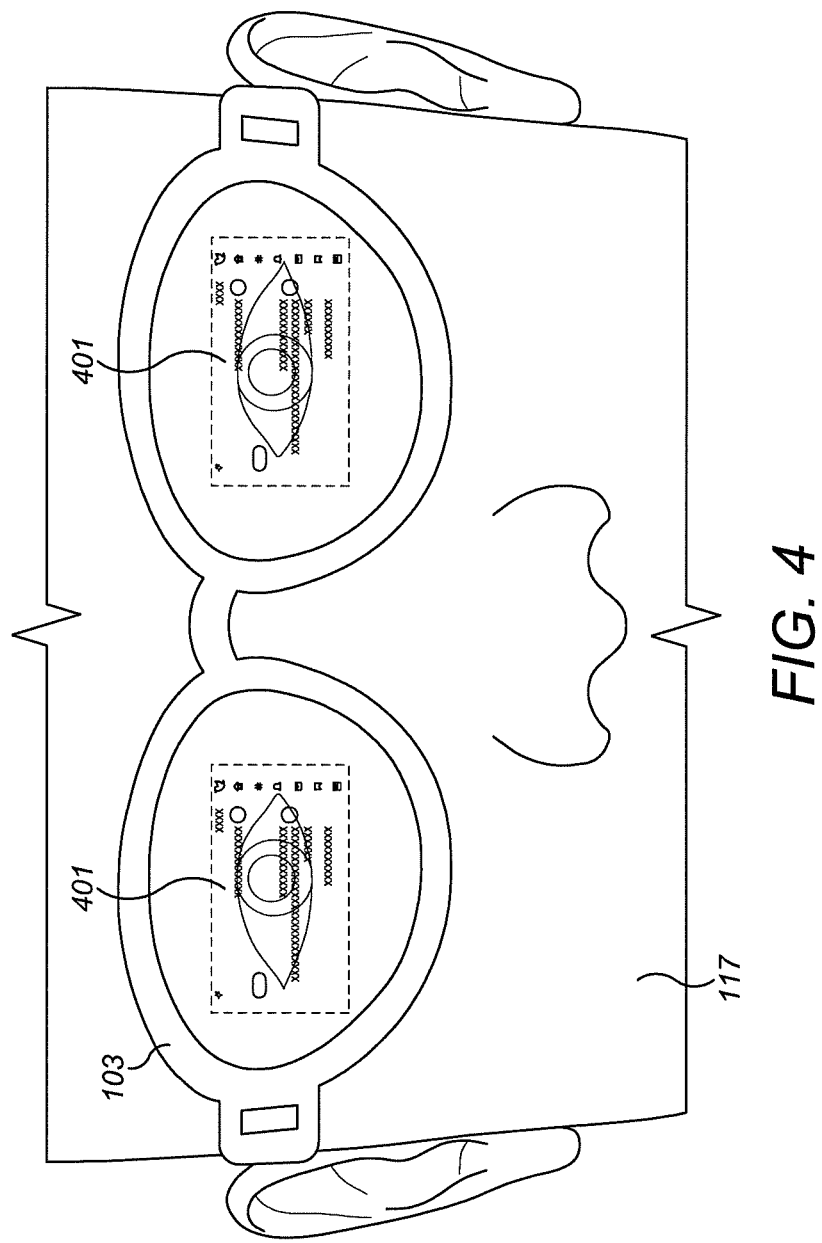
FIG. 4 shows an example head mounted item in use.

FIG. 4 shows an example head mounted item 103 in use. In this example the head mounted item 103 comprises an augmented reality headset. The augmented reality headset can be as shown in FIG. 2 or could have any other suitable configuration.

In the example of FIG. 4 a user 117 is using the head mounted item 103. The user is wearing the head mounted item 103 so that the light guides 205 of the head mounted item 103 are positioned in front of the user's eyes. In this example, the view of the user's pupils is blocked and the user's pupils are not visible to an external user and are not visible in captured images comprising the user 117.

In the example of FIG. 4 the head mounted item 103 is displaying content 401 to the user. The content 401 could be mediated reality content or any other suitable type of content. Some of the light from the image source 203 leaks outwards from the head mounted item 103 so that some of the content 401 is visible to an external user.

In the example of FIG. 4 the positions of the user's pupils cannot be determined by an external user or by an electronic device 105 that captures images of the user 117. This makes it difficult to position image augmentations within captured images of the user.

Figure 5:
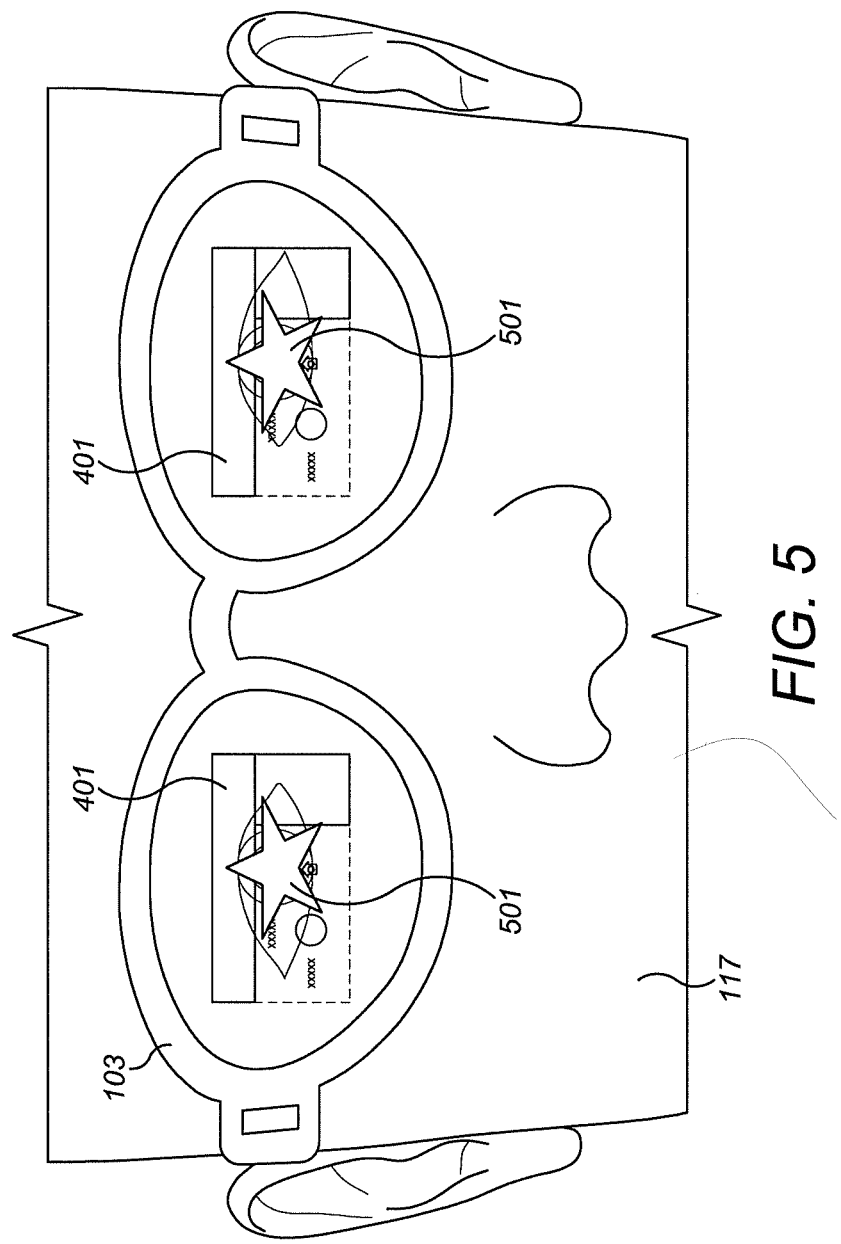
FIG. 5 shows an example head mounted item in use.

FIG. 5 shows another example of a head mounted item 103. In this example indications 501 of the locations of the user's pupils are displayed to so as to enable image augmentations to be positioned in captured images of the user 117.

In the example of FIG. 5 the user 117 is using the head mounted item 103 to view content 401. The head mounted item 103 blocks the user's pupils so that they are not visible to an external user or in captured images of the user 117.

It can be determined that an indication of the location of the user's pupils is needed. For instance, it can be determined that an image of the user 117 is being captured or that image augmentations are to be used. This determination could be based on signals from the electronic device 105 that is capturing the images of the user, from a detecting of an electronic device 105 in front of the user 117 or from any other suitable trigger event.

After it has been determined that an indication of the location of the user's pupils is needed the gaze tracking sensors 109 of the head mounted item 103 are used to determine the locations of the user's pupils. Once the location of the user's pupils has been determined the head mounted item 103 is configured to display an indicator 501 to indicate the position of the user's pupils. The indicator 501 is displayed so that it is visible to an external user.

In some examples the indicator 501 can be displayed temporarily. In some examples the indicator 501 can be a transitory image that is displayed briefly for still image capture. The brief display could be a single refresh frame. If the indicator 501 is being used during the capture of video images the indicator 501 could alternate between being displayed and not being displayed. The alternating on and off of the indicator 501 could be used in cases where the indicator 501 is not intended to be used as part of the augmented image.

In some examples the temporary display of the indicator 501 can make the indicator imperceptible, or substantially imperceptible, to the user wearing the head mounted item 103. For example, the user of the head mounted item 103 could perceive only a very quick flash of colour. In some examples the temporary display of the indicator 501 could be synchronized with blinking by the user of the head mounted item 103. In such cases, the timing of the display of indicator 501 could be controlled so that it is only displayed when the user's eyes are shut.

In the example of FIG. 5 the indicators 501 comprise simple graphical items. The simple graphical items can be easily detected by image recognition algorithms. In the example of FIG. 5 the indicators 501 comprise stars. Other types of indicators 501 could be used in other examples. For instance, the indicators 501 could comprise information relating to the content that is being used by the user 117. Such indicators 501 could comprise an image representing an application or content that the head mounted item 103 is currently providing for the user 117. The image could be an icon associated with the content or any other suitable image. The image could be a dark spot resembling the actual pupil of the eye.

In the example of FIG. 5 a first indicator 501 indicates the position of the user's left eye and a second indicator 501 indicates the position of the right eye. In some examples only a single indicator 501 might be displayed. For instance, the head mounted item 103 could be a monocular device that only covers one of the user's eyes.

The indicators 501 can be used by an electronic device 105 to position image augmentations such as graphical overlays or other augmentations.

When the electronic device 105 is being used to capture an image of the user 117 image recognition processing can be used to determine that the user 117 is wearing a head mounted item 103. The image recognition processing can then be used to detect the indications 501 of the locations of the user's pupils. These indications can then be used as reference points for the positioning of one or more image augmentations.

In the example of FIG. 5 the indications 501 can be displayed using outcoupled light from the head mounted item 103. In this example the images provided by the display 111 in the image source 203 can be controlled to include the indications 501. This ensures that the outcoupled light comprises the indications 501.

Figure 6A:
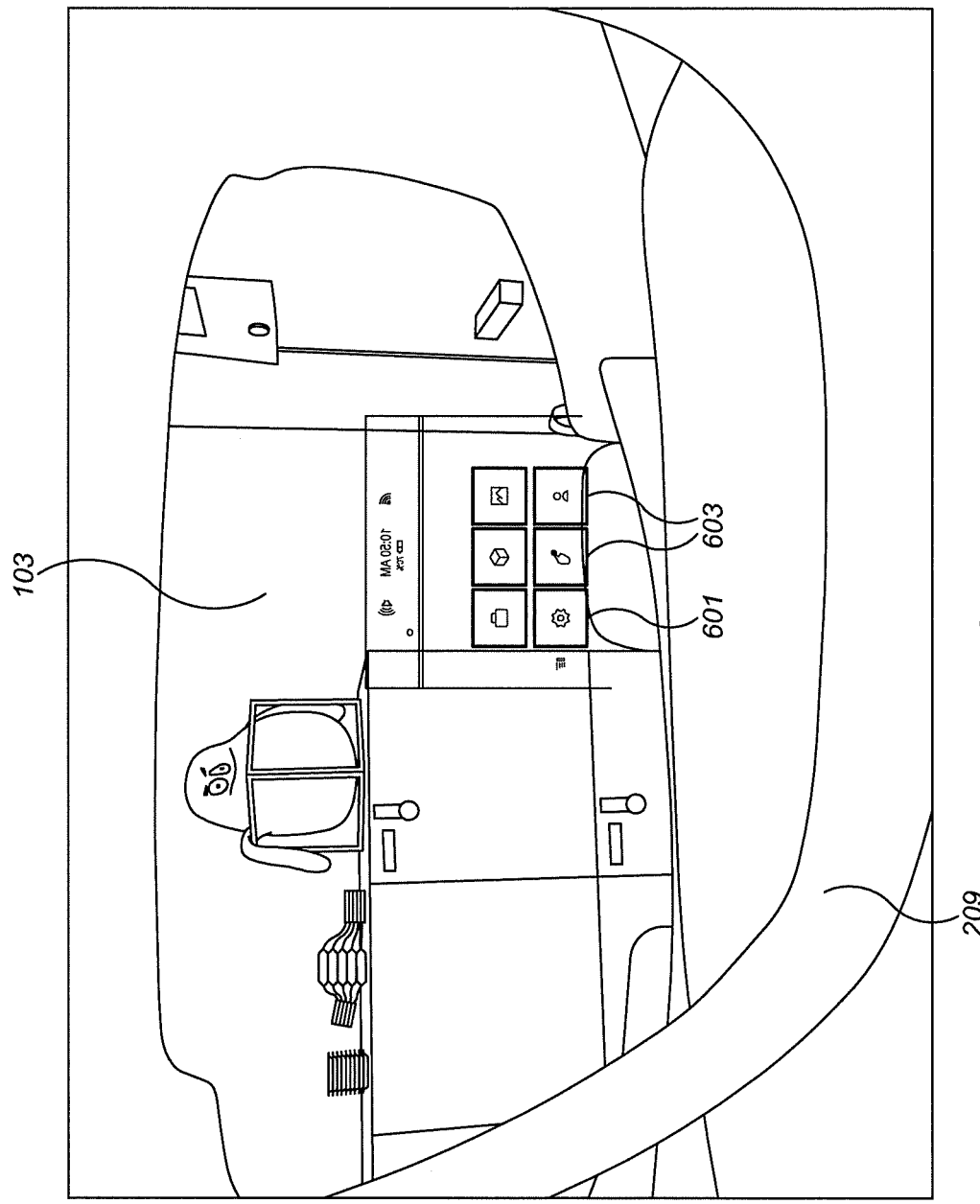
FIGS. 6A and 6B show an example head mounted item in use.
Figure 6B:
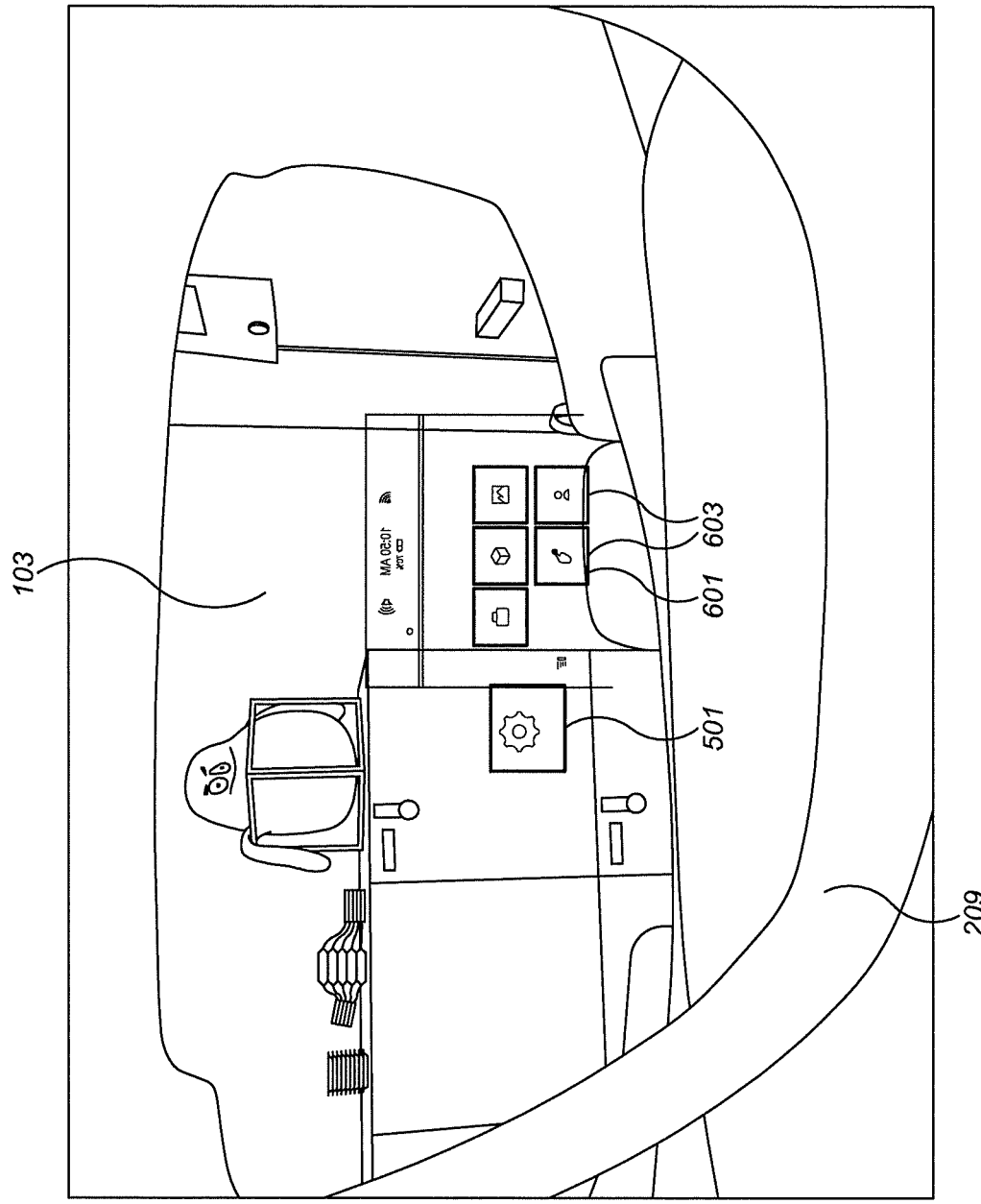

FIGS. 6A and 6B show another example head mounted item 103 according to examples of the disclosure. In this example the indication 501 of the location of the user's pupils comprises content from the applications of the head mounted item 103.

FIGS. 6A and 6B show the view of the head mounted item 103 as would be seen by an external user. FIGS. 6A and 6B shows an example of the left eye portion of the head mounted item 103. The edge of the frame 209 can be seen, slightly out of focus, in the image. In this example a user 117 is not wearing the head mounted item 103 and the head mounted item 103 is just rested on a surface to illustrate the examples of the disclosure.

In this case the light outcoupled from the light guides 205 causes content 601 from the image source 203 to be visible on a surface of the head mounted item 103. The surface could be an outer surface. An external user looking at a user 117 wearing the head mounted item 103 would be able to see the content 601.

FIG. 6A shows an example of content 601 that might be displayed by the image module 203 of the head mounted item 103 before examples of the disclosure are implemented. This shows the content 601 before it is adjusted to show the location of the user's pupils.

In the example of FIG. 6A the content 601 comprises a plurality of items 603. The items 603 can comprise graphical items that can be viewed or selected by a user 117 of the head mounted item 103. In the example of FIG. 6A the items 603 are shown as squares but any shapes or configurations could be used for the items. In this example the items 603 are shown with a black border for clarity in the FIGS. The black borders would not be displayed if the content 601 is displayed using a waveguide.

In the example of FIG. 6A the items 603 are arranged in grid. In this example the grid comprises six items 603 arranged in an array comprising two rows and three columns. In this example all of the items 603 are positioned close to each other.

FIG. 6B shows an example of how the content 601 can be adjusted to indicate the location of the user's pupil. In this example, once the location of the user's pupil has been determined part of the content 601 is moved so that is aligned with the user's pupil.

In the example of FIG. 6B one of the items 603 is moved away from the grid of items 603 so that it is now displayed in a different location to the rest of the items. This item 603 is displayed in a position that is aligned with the position of the user's pupils and so provides an indication 501 of the location of the user's pupils. This can leave a blank space in the grid where the item that has been moved was previously displayed.

The item 603 that is moved away from the grid of items can be selected based on any suitable criteria. In some examples, the item 603 that is moved could be the item that is closest to the position of the user's pupil. This would reduce the movement and rearrangement of the items 603 that is needed. In some examples the item 603 that is moved could be selected based on how frequently it is selected. For instance, an item 603 that is rarely selected over an item 603 that is often selected. In some examples the item 603 that is moved could be selected so as to have minimal, or substantial minimal, impact on the user's viewing experience.

In some examples the item 603 that is moved can be modified compared to the other items 603 or content that is displayed by the head mounted item 103. The modifications that are made to the item 603 that is moved can be made to make the indication 501 easier to recognize or differentiated from the other content 601. For example, the item 603 that is used for the indication 501 could be displayed with a different size, shape, brightness, colour, or other characteristic that could be detected by the electronic device 105.

In this example the content that is used to provide the indication 501 is still visible to the user 117 of the head mounted item 103 but also functions as an indication of the location of the user's pupil and can be used for positioning image augmentations.

Figure 7:
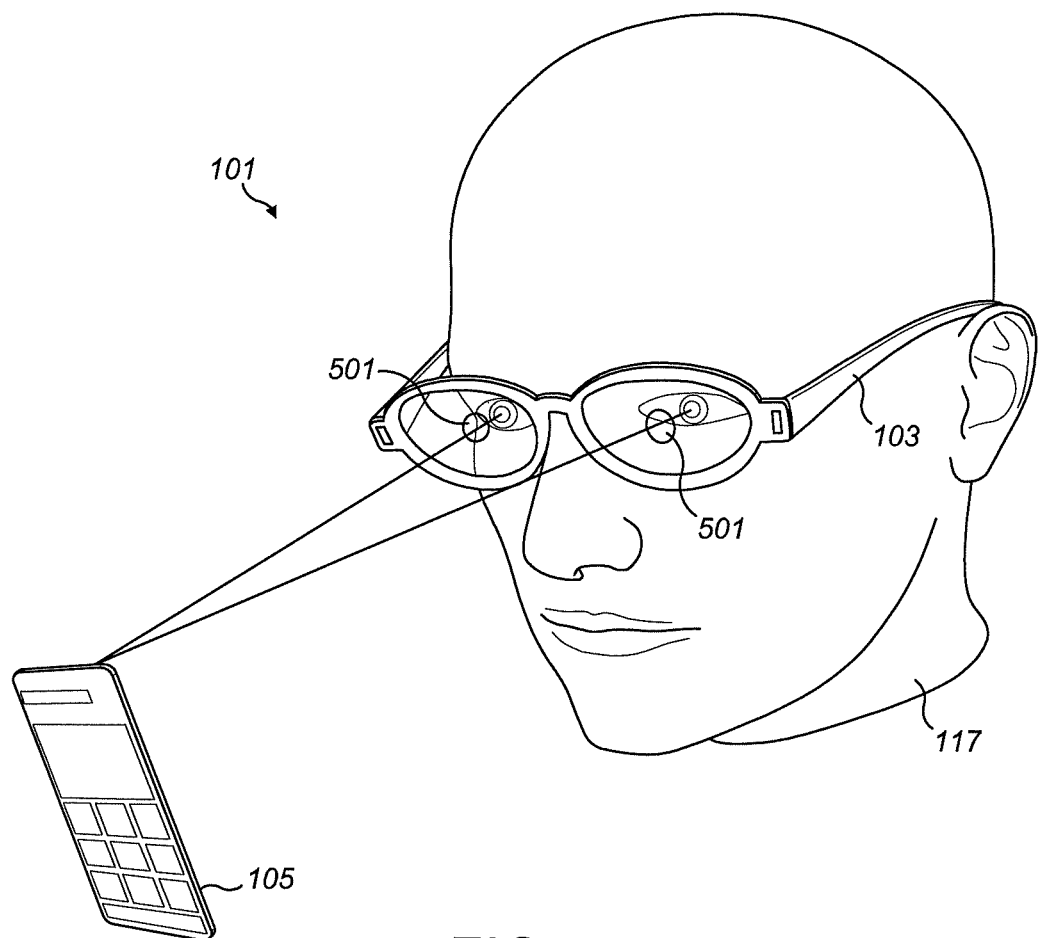
FIG. 7 shows an example system in use.

FIG. 7 shows an example system 101 in use. In this system a user 117 is using a head mounted item 103 to view content and an electronic device 105 is being used to capture images of the user 117.

In this example the gaze tracking sensors 109 of the head mounted item 103 determine the position of the user's pupils. The head mounted item 103 is controlled to display an indication 501 of the location of the user's pupils.

In this example the indication 501 is displayed on the shutter 207 of the head mounted item 103. The liquid crystals of the shutter 205 can be controlled to display an indication 501. The indications 501 that are displayed on the shutter 207 might not be visible to the user 117 of the head mounted item 103, or their visibility may be weak due to blurring of the edges. The indications 501 can be displayed on the shutter 207 without modifying the content that is displayed by the image module 203.

In the example of FIG. 7 the indications 501 comprise dots. Other types of indications 501 could be used in other examples. The indications 501 can be sized and shaped so that they can be easily recognized in images of the user 117 and used for the positioning of the image augmentations.

Figure 8:
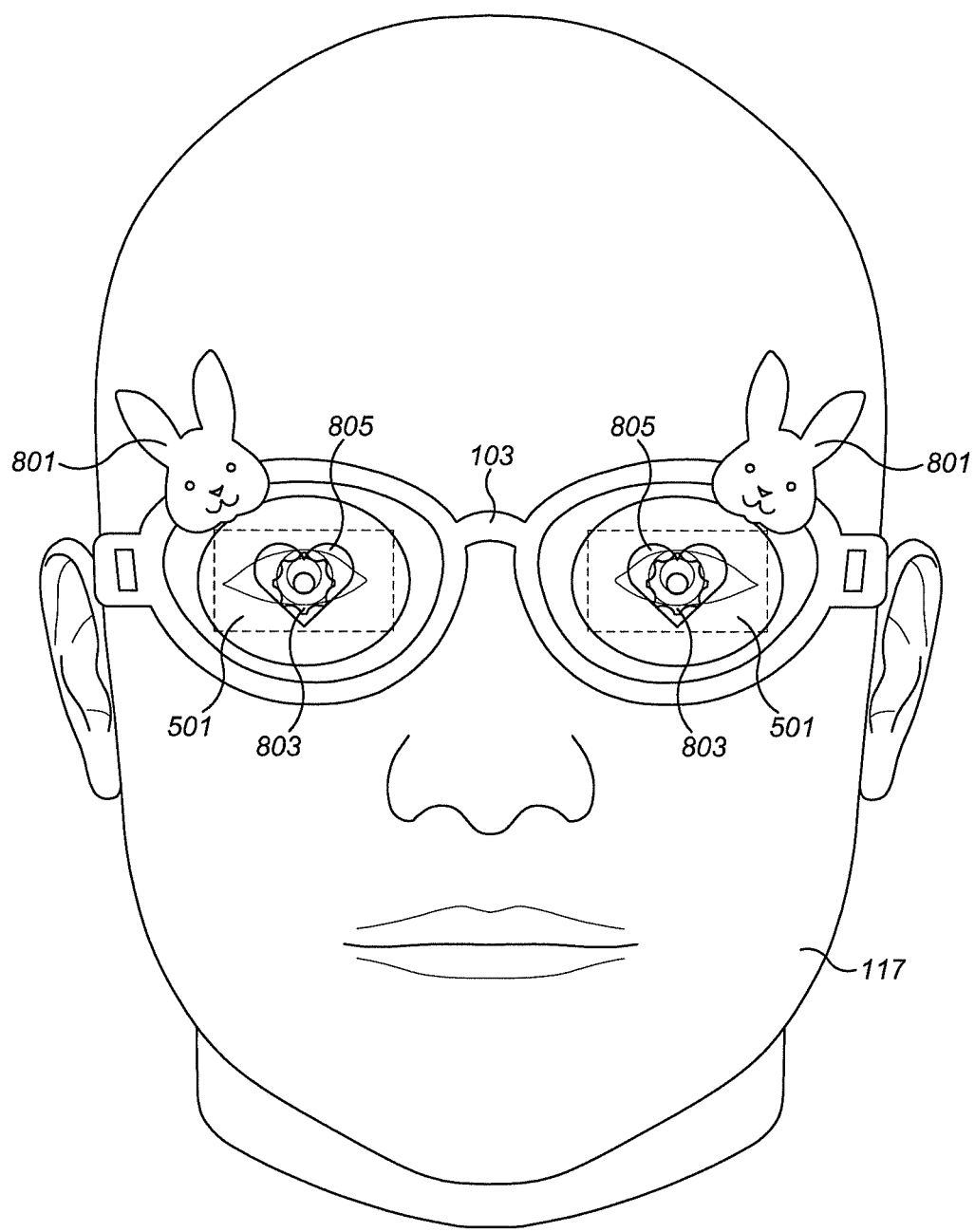
FIG. 8 shows an example image augmentation.

FIG. 8 shows an example image with image augmentations 801. In this example the indications 501 can be incorporated into the image with image augmentations 801. In this example the image augmentations would not be transparent. For example, they could be a solid colour or could be black or white.

In this example the indication 501 of the location of the user's pupil comprises a first component 803 and a second components 805. In this example different parts of the head mounted item 103 can be sued to display the different components of the indication 501. In this example, the first component 803 can comprise leaked or outcoupled light from the image module 203 and the second component 805 can comprise content displayed on the shutter 207. Enabling different parts of the head mounted item 203 to be used to display different components of the indication 591 can enable a wider range of types of indications 501 to be used.

In this example the first component 803 of the indication comprises a wheel shaped image and the second component 805 comprises a heart shaped image. Other shapes could be used in other examples.

The image comprises image augmentations 801, in this example two rabbit shapes that are displayed above the user's eyes. The heart shape and the wheel that are used for the indication 501 of the location of the user's pupils can be combined with this images of the rabbits to create an overall feature or image.

In other examples other types of images and augmentations can be used in which the indications 501 are incorporated within the image augmentation.

In some examples the image augmentations can also be used to add an indication to the captured images. For instance, the electronic device 105 could be positioned relative to the user 117 so that only one of the indications 501 is visible in the captured images of the user 117. In such examples the image augmentation could be configured to add the other indication 501 to the appropriate location of the other eye so as to generate the desired image augmentation.

In other examples the indications 501 might be undesirable within the image augmentation. In such example the electronic device 105 that captures the images could be configured to perform image processing to remove the unwanted indications form the images.

FIG. 9 schematically illustrates an apparatus 107/113 that can be used to implement examples of the disclosure. In this example the apparatus 107/113 comprises a controller 901. The controller 901 can be a chip or a chip-set. In some examples the controller can be provided within a head mounted item 103 or an electronic device 105 or any other suitable type of device.

In the example of FIG. 9 the implementation of the controller 901 can be as controller circuitry. In some examples the controller 901 can be implemented in hardware alone, have certain aspects in software including firmware alone or can be a combination of hardware and software (including firmware).

As illustrated in FIG. 9 the controller 901 can be implemented using instructions that enable hardware functionality, for example, by using executable instructions of a computer program 907 in a general-purpose or special-purpose processor 903 that can be stored on a computer readable storage medium (disk, memory etc.) to be executed by such a processor 903.

The processor 903 is configured to read from and write to the memory 905. The processor 903 can also comprise an output interface via which data and/or commands are output by the processor 903 and an input interface via which data and/or commands are input to the processor 903.

The memory 905 is configured to store a computer program 907 comprising computer program instructions (computer program code 909) that controls the operation of the controller 901 when loaded into the processor 903. The computer program instructions, of the computer program 907, provide the logic and routines that enables the controller 901 to perform the methods illustrated in FIG. 3 The processor 903 by reading the memory 905 is able to load and execute the computer program 907.

In some examples the apparatus 107 can be provided within a head mounted item 103. In such examples the apparatus 107 can comprise: at least one processor 903; and at least one memory 905 including computer program code 909, the at least one memory 905 storing instructions 909 that, when executed by the at least one processor 903, cause the apparatus 107 at least to perform:

using gaze tracking to determine 301 a location of a user's pupil wherein the user is wearing a head mounted item 103; and enabling display 303 of an indication of the location of the user's pupil so that the indication is visible on a surface of the head mounted item 103 and wherein the indication is configured to be used for positioning at least one image augmentation for a captured image comprising the user 117.

In some examples the apparatus 113 can be provided within an electronic device 105. In such examples the apparatus 113 can comprise: at least one processor 903; and at least one memory 905 including computer program code 909, the at least one memory 905 storing instructions 909 that, when executed by the at least one processor 903, cause the apparatus 113 at least to perform:

detecting 305 an indication of the location of a user's pupil wherein the user is wearing a head mounted item 103 and the indication is displayed so that it is visible on a surface of the head mounted item 103;

capturing 307 one or more images comprising the user 117; and using 309 the indication of the location of the user's pupil to position at least one image augmentation for at least one captured image comprising the user 117.

As illustrated in FIG. 9 the computer program 907 can arrive at the controller 901 via any suitable delivery mechanism 911. The delivery mechanism 911 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 907. The delivery mechanism can be a signal configured to reliably transfer the computer program 907. The controller 901 can propagate or transmit the computer program 907 as a computer data signal. In some examples the computer program 907 can be transmitted to the controller 901 using a wireless protocol such as Bluetooth, Bluetooth Low Energy, Bluetooth Smart, 6LoWPan ($IP_v6$ over low power personal area networks) ZigBee, ANT+, near field communication (NFC), Radio frequency identification, wireless local area network (wireless LAN) or any other suitable protocol.

In examples where the computer program is for use in a head mounted item 103 the computer program 907 can comprise computer program instructions which, when executed by an apparatus 107 causing the apparatus 107 to perform at least the following:

using gaze tracking to determine 301 a location of a user's pupil wherein the user is wearing a head mounted item 103; and enabling display 303 of an indication of the location of the user's pupil so that the indication is visible on a surface of the head mounted item 103 and wherein the indication is configured to be used for positioning at least one image augmentation for a captured image comprising the user 117.

In examples where the computer program is for use in an electronic device the computer program 907 can comprise computer program instructions which, when executed by an apparatus 113 causing the apparatus 113 to perform at least the following:

detecting 305 an indication of the location of a user's pupil wherein the user is wearing a head mounted item 103 and the indication is displayed so that it is visible on a surface of the head mounted item 103;

capturing 307 one or more images comprising the user 117; and using 309 the indication of the location of the user's pupil to position at least one image augmentation for at least one captured image comprising the user 117.

The computer program instructions can be comprised in a computer program 907, a non-transitory computer readable medium, a computer program product, a machine readable medium. In some but not necessarily all examples, the computer program instructions can be distributed over more than one computer program 907.

Although the memory 905 is illustrated as a single component/circuitry it can be implemented as one or more separate components/circuitry some or all of which can be integrated/removable and/or can provide permanent/semi-permanent/dynamic/cached storage.

Although the processor 903 is illustrated as a single component/circuitry it can be implemented as one or more separate components/circuitry some or all of which can be integrated/removable. The processor 903 can be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" can refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software can not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The apparatus 107/113 as shown in FIG. 9 can be provided within any suitable device. In some examples the apparatus 113 can be provided within an electronic device such as a mobile telephone, a teleconferencing device, a camera, a computing device or any other suitable device. In some examples the apparatus 107 could be provided within a head mounted item 103 such as a mediated reality headset. In some examples the apparatus 107/113 could be provided in any suitable component of a system 101 comprising an electronic device 105 and a head mounted item 103. In some examples the apparatus 113 is an electronic device 105 such as a mobile telephone, a teleconferencing device, a camera, a computing device or any other suitable device.

The blocks illustrated in FIGS. 3A and 3B can represent steps in a method and/or sections of code in the computer program 907. The illustration of a particular order to the blocks does not necessarily imply that there is a required or preferred order for the blocks and the order and arrangement of the blocks can be varied. Furthermore, it can be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus, comprising means for:
   at least one processor; and
   at least one memory storing instructions that, when executed with the at least one processor, cause the apparatus to perform:
   using gaze tracking to determine a location of a user's pupil wherein the user is wearing a head mounted item; and
   enabling display of an indication of the location of the user's pupil so that the indication is visible on a surface of the head mounted item and wherein the indication is configured to be used for positioning at least one image augmentation for a captured image comprising the user.

2. An apparatus as claimed in claim 1 wherein the at least one image augmentation comprises a graphical overlay and wherein the instructions, when executed with the at least one processor, cause the apparatus to superimpose the graphical overlay over at least part of the image comprising the user.

3. An apparatus as claimed in claim 1 wherein the instructions, when executed with the at least one processor, incorporate at least part of the indication as part of the at least one image augmentation.

4. An apparatus as claimed in claim 1 wherein the instructions, when executed with the at least one processor, cause the apparatus to display the indication of the location of the user's pupil on a shutter of the head mounted item.

5. An apparatus as claimed in claim 1 wherein the indication of the location of the user's pupil comprises outcoupled light from the head mounted item.

6. An apparatus as claimed in claim 5 wherein at least part of an image displayed with the head mounted item is adapted to enable the outcoupled light to be used to identify the position of the user's pupil.

7. An apparatus as claimed in claim 1 wherein the instructions, when executed with the at least one processor, enable an exchange of information with an electronic device being used to capture the image comprising the user wherein the information comprises information relating to at least one of: relative positions of the electronic device and the head mounted item, or relative orientations of the electronic device and the head mounted item.

8. An apparatus as claimed in claim 1 wherein the head mounted item comprises an augmented reality headset.

9. A head mounted item comprising an apparatus as claimed in claim 1.

10. A method comprising:
using gaze tracking to determine a location of a user's pupil wherein the user is wearing a head mounted item; and
enabling display of an indication of the location of the user's pupil so that the indication is visible on a surface of the head mounted item and wherein the indication is configured to be used for positioning at least one image augmentation for a captured image comprising the user.

11. A non-transitory program storage device readable with an apparatus, tangibly embodying a program of instructions executable with the apparatus for performing the method of claim 10.

12. An apparatus, comprising:
at least one processor; and
at least one memory storing instructions that, when executed with the at least one processor, cause the apparatus to perform:
detecting an indication of a location of a user's pupil wherein the user is wearing a head mounted item and the indication is displayed so that it is visible on a surface of the head mounted item;
capturing one or more images comprising the user; and
using the indication of the location of the user's pupil to position at least one image augmentation for at least one captured image comprising the user.

13. An apparatus as claimed in claim 12 wherein the instructions, when executed with the at least one processor, cause the apparatus to remove the indication of the location of the user's pupil from respective ones of the captured one or more images comprising the user.

14. A method comprising:
detecting an indication of a location of a user's pupil wherein the user is wearing a head mounted item and the indication is displayed so that it is visible on a surface of the head mounted item;
capturing one or more images comprising the user; and
using the indication of the location of the user's pupil to position at least one image augmentation for at least one captured image comprising the user.

15. A non-transitory program storage device readable with an apparatus, tangibly embodying a program of instructions executable with the apparatus for performing the method of claim 14.

* * * * *